United States Patent [19]

Smith

[11] E Re. 28,717

[45] Reissued Feb. 24, 1976

[54] NOISE REDUCTION APPARATUS AND METHOD

[75] Inventor: Fred T. Smith, Newark, Ohio

[73] Assignee: Sargent Industries, Inc., Los Angeles, Calif.

[22] Filed: Dec. 9, 1974

[21] Appl. No.: 530,693

Related U.S. Patent Documents

Reissue of:

[64] Patent No.: 3,822,551
Issued: July 9, 1974
Appl. No.: 401,222
Filed: Sept. 27, 1973

U.S. Applications:

[62] Division of Ser. No. 274,798, July 24, 1972, abandoned.

[52] U.S. Cl. ..... 60/428; 60/431; 60/469; 60/486

[51] Int. Cl.[2] ..... F16H 39/48

[58] Field of Search ..... 60/428, 431, 449, 469, 60/486

[56] References Cited

UNITED STATES PATENTS

| | | | |
|---|---|---|---|
| 3,171,247 | 3/1965 | McAlvay | 60/486 X |
| 3,360,925 | 1/1968 | Zimmerman | 60/486 X |
| 3,451,219 | 6/1969 | Rannenberg | 60/431 X |
| 3,459,131 | 8/1969 | Senf | 60/431 X |
| 3,583,154 | 6/1971 | Utter | 60/449 X |

*Primary Examiner*—Edgar W. Geoghegan
*Attorney, Agent, or Firm*—Ellsworth R. Roston

[57] ABSTRACT

An apparatus and method for operating an auxiliary hydraulic load at low noise levels. A pump having a capacity which is sufficiently large to supply the load with the necessary volume of hydraulic fluid at relatively low pump speeds is driven by an engine operating at a speed near its idling speed. Throttle control means control the fuel supply to the engine at a level sufficient to drive the pump while maintaining the engine speed near its idling speed. When the engine speed is increased to a predetermined level in excess of its idling speed, means are provided to maintain the output from the pump at or below a predetermined flow rate to not overload the pump means or the auxiliary load. The pump may include a variable displacement pump or a plurality of fixed displacement pumps with means to vary the pump output in response to the pressure demand from the auxiliary load to maintain the torque input requirements for the pump below a predetermined level. The throttle control means may be actuated in response to the pressure demands of the auxiliary load to vary the torque from the engine in response to the torque input required for operation of the pump while the engine is operating at a speed near its idling speed.

8 Claims, 6 Drawing Figures

NOISE REDUCTION APPARATUS AND METHOD

Matter enclosed in heavy brackets [ ] appears in the original patent but forms no part of this reissue specification; matter printed in italics indicates the additions made by reissue.

This is a division of application Ser. No. 274,798, filed July 24, 1972, now abandoned.

BACKGROUND OF THE INVENTION

With the increasing concern of society in protecting and improving the environment, the problem of noise pollution is receiving much study. People who live in cities are surrounded by all manner and variety of noises ranging from the roar of jet planes to the rumble of freeway traffic. This vast accumulation of noise can be quite harmful in causing diminished hearing. Also, although not precisely measurable, noise can and does have an adverse effect upon the emotional stability and mental health of the recipients.

People are now asking seriously whether machines created to be servants of man are not, in fact, becoming his master. Surely, this is a fair question in regard to noise pollution where the constant cacophony of machine noises disrupts man's thinking processes, interferes with his sleep, and oftentimes threatens to destroy his sanity.

A common source of noise in the city is the strident noise of a truck engine as it turns over at high speeds in operating the auxiliary equipment carried on the truck. As one example, consider the noise of a truck engine in operating the packing mechanism for refuse collection equipment during the pick up of refuse in a residential neighborhood. The collection of refuse begins early in the morning and, thus, the noise of the laboring truck engine operating at high speed may well be the first sound which greets the ear of a city resident on awakening. Even worse, the noise of the truck engine may be the causation for an unwanted early awakening by the sleeper.

Many types of auxiliary truck equipment, such as the packing mechanism for a refuse loader, go through a cycling operation in which the load requirements on the engine will vary. Thus, for example, in the operation of a refuse packing mechanism, the refuse will first be placed in a hoper positioned within a tailgate structure on a truck. The refuse is then swept from the hopper and moved through an opening connecting the hopper with a refuse storage body positioned on the truck frame. As the refuse is moved into the opening and packed under great pressures, the pressure demands of the packing mechanism are very high. The pressure demands at this stage of packing are generally considerably higher, for example, than the pressure demands when the refuse is being swept from the hopper. For a more detailed description of a refuse packing mechanism, reference is made to U.S. Pat. No. 2,879,906, issued Mar. 31, 1959.

During operation of an auxiliary load on a truck, it has previously been necessary to maintain the truck engine at a relatively high speed when the auxiliary load is variable, as in the case of a refuse packing mechanism. This was done to prevent the truck engine from stalling when the power demands imposed by the variable load were increased. To prevent stalling, it was customary to maintain the truck engine at a relatively high speed to provide the output from the engine at a level sufficient to operate the variable load under the maximum power conditions imposed by the load. This method of operation, while perhaps satisfactory to prevent stalling, was inefficient and produced a high noise level from the truck engine in driving the auxiliary load.

By maintaining the engine speed at a level to supply the maximum power demand from the auxiliary load, the engine produced more power than was needed by the load at power demands less than its maximum. To dissipate this unused power during the minimum power demand portions of the variable load cycle, it was necessary to shunt a portion of the output from a pump driven by the engine to a sump during the minimum power demand portions of the variable load cycle. Thus, the full output of the pump was used only during the maximum power demand portions of the variable load cycle.

In the operation of auxiliary equipment, some manufacturers have mounted an auxiliary engine on the truck to operate the auxiliary equipment. The auxiliary engines are relatively small and operate at a high rate of speed to develop their maximum horse-power in driving the auxiliary equipment. This type of operation has not been satisfactory in terms of abating noise pollution since a small engine operating at a high speed is a very efficient generator of noise. Also, this type of operation is inefficient since it requires dissipation of unusable engine output except when the load is in the maximum power demand portion of its cycle.

SUMMARY OF THE INVENTION

In providing a solution to the above problems, the present invention provides an apparatus for operating an auxiliary mechanism at greatly reduced noise levels. In addition, the present invention provides an apparatus and a method for driving a variable auxiliary load in which the driving power is more efficiently utilized by the load. Also, it provides an apparatus and a method in which an engine that drives an auxiliary load is operated at a relatively low speed near the engine idling speed. This results in reduced engine wear, increased engine life and reduced maintenance costs as compared with previous devices in which an engine providing power for a variable auxiliary load was operated at a relatively high rate of speed to prevent engine stalling.

In accord with the invention, a variable volume or variable pressure auxiliary hydraulic load is driven by a pump means having a capacity sufficiently large to supply the demands of the load when the pump means is operating at relatively low speeds, which may be 1,000 rpm. or less. Engine means are operably connected to the pump means for supplying power to the pump means. The operation of the engine in supplying power to the variable auxiliary hydraulic load is at a relatively low speed near the idling speed of the engine. With a truck engine, which operates at a relatively high speed, such as about 4000 rpm., in powering a truck over the highways, the engine operates at a relatively low speed near its idling speed in powering the auxiliary load which may be about 700 to about 1,000 rpm. or less. When operating in this manner, the engine means is operating at about one-quarter or one-third or less of its maximum speed and horsepower and, thus, operates at a low noise level in providing power for operation of the auxiliary load.

During operation of the auxiliary load by the engine means, throttle means may control the fuel supply to the engine at a level sufficient to maintain its horsepower output at a level to operate the pump means while also maintaining the speed of the engine means at about its idling speed or slightly higher. When the engine speed is increased to a predetermined level, for example, in performing its primary work function, means are provided to maintain the flow rate of fluid through the pump means at or below a predetermined level based on its capacity. Thus, if the engine means were providing power to the auxiliary load at an engine speed of 700 rpm. and the engine speed was then increased to concurrently power a truck while driving the auxiliary load, the flow rate through the pump would be maintained at a level that does not exceed the capacity of the pump. In one form of the invention, this is accomplished by providing a centrifugal clutch in the drive train between the engine means and the pump means. Thus, when the engine speed exceeds a predetermined level, the clutch automatically disengages the drive between the engine means and the pump means.

In the use of the apparatus of the present invention for operation of a variable volume and variable pressure auxiliary hydraulic load, a fluid reservoir may be provided in flow communication with the pump means to provide an open loop hydraulic circuit which includes the pump means and the variable load. This provides greater flexibility in the functioning of the apparatus by providing a variable volume of hydraulic fluid for operation of the auxiliary load. For example, if the variable load includes a hydraulic cylinder having a relatively large volume, a large volume of hydraulic fluid will be stored within the cylinder during a portion of its operation. The reservoir provides a source of hydraulic fluid to supply the cylinder and the stored hydraulic fluid can then be quickly discharged to the fluid reservoir during another phase of the load cycle when the load does not require a large volume of fluid.

The pump means employed to operate the auxiliary may be a fixed displacement pump whose capacity is sufficiently large to satisfy the maximum volume of hydraulic fluid demanded by the variable load. The pump means is driven by an engine means whose torque output, when operating at a speed near its idling speed, is adequate to supply the torque input required to operate the pump means in powering the auxiliary hydraulic load. the In another embodiment of the invention, the pump means may include a variable displacement pump and means for reducing the displacement of the pump in response to increased pressure demands from the variable load. The input torque required to drive the pump means is proportional to the volume of fluid being pumped by the pump means and also to the pressure demands of the variable hydraulic load. Thus, when the pressure demands of the variable hydraulic load rise to a predetermined level, the displacement of the variable displacement pump may be reduced proportionately to maintain the input torque required to drive the pump means at or below a predetermined level. In this manner, the engine means is able to supply the necessary power required to drive the pump means while operating at a relatively low speed near its idling speed.

In another embodiment of the invention, the pump means may include a plurality of fixed displacement pumps with means for varying the number of pumps in operation in response to the pressure demands of the variable hydraulic load. By reducing the number of fixed displacement pumps in operation when the pressure demands of the variable hydraulic load reach a predetermined level, the torque required to drive the pump means may be maintained at or below a predetermined level. Then, when the pressure demands of the variable hydraulic load are reduced, the number of fixed displacement pumps in operation may be increased to increase the volume of hydraulic fluid and to increase the speed of operation of the variable load while maintaining the torque input requirements of the pump means below a predetermined level.

In a further embodiment of the invention, a throttle control means may vary the fuel supplied to the engine means in response to the pressure demands of the variable load. The torque output produced by the engine means may then be varied in response to the pressure demands of the variable load while the volume of the fluid discharged to the system by the pump means is likewise varied in response to the pressure demands of the variable load. The torque output of the engine means may, thus, be controlled so that it matches the input torque required for operation of the pump means. This provides a more efficient operation in which the torque output of the engine is more effectively utilized by the pump means in driving the auxiliary load.

In a further embodiment of the invention, a throttle control device may be employed which varies the fuel supplied to the engine in response to both the pressure demands of the auxiliary load and the volume of hydraulic fluid supplied to the load by the pump means. When used with a pump means which includes a plurality of fixed displacement pumps, the throttle control device may receive a pressure input which is proportional to the system pressure and the load demands of the variable auxiliary load and a pressure input which is proportional to the volume of hydraulic fluid supplied to the system by a pump which discharges fluid to the system when the system pressure is at or below a predetermined pressure. The combined pressure inputs to the throttle control device, based on both the system pressure and the volume of fluid discharged to the system by the pump means control the movement imparted to a throttle control lever by the throttle control device. The quantity of fuel supplied to the engine and the output torque of the engine are, thereby, controlled by both the volume of fluid discharged to the system by the pump means and the system pressure against which the pump means works in supplying the variable hydraulic load with fluid.

Through use of the present apparatus and method, a relatively large engine is used to provide the power for a relatively small auxiliary load. In providing the power for the auxiliary load, the engine is operated at a relatively low speed near its idling speed. When operated in this manner, the engine means may be operating at about 25 percent or less to about 34 percent of its maximum speed and horsepower. The engine means thereby provides the power for the auxiliary load at a very low noise level. The output torque generated by the engine means and the input torque required by the pump means in supplying the auxiliary load, are preferably interrelated so that overall efficiency is maximized with the output torque from the engine means being effectively used in driving the pump means.

BRIEF DESCRIPTION OF THE DRAWINGS

In the drawings, which are to be regarded as merely illustrative of the invention.

DETAILED DESCRIPTION

Figure 1:
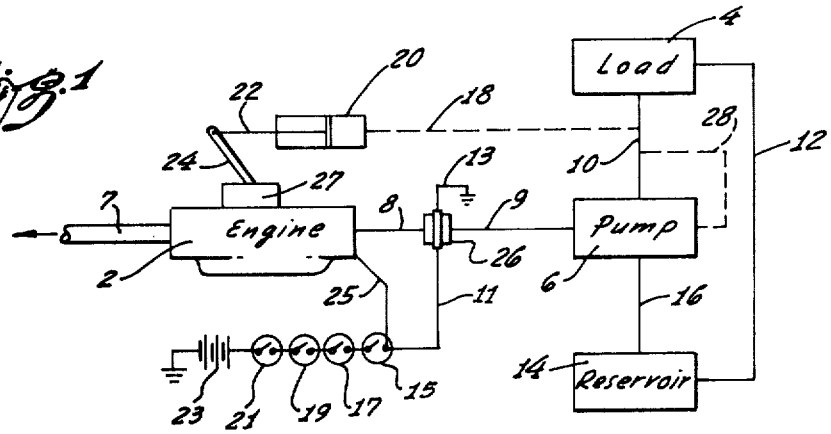
FIG. 1 is a schematic view of a system in which an engine operating near its idling speed provides the power at a low noise level to perform a secondary work function in operating an auxiliary load.

With reference to FIG. 1, a relatively large engine 2 whose primary work function may be in driving a truck through a main output shaft 7, is utilized to perform a secondary work function in providing power to operate an auxiliary load 4 through an auxiliary output shaft 8. The auxiliary shaft 8 is connected through a centrifugal clutch 26 to an input shaft 9 to a pump 6. The pump 6 receives hydraulic fluid through an input line 16 from a reservoir 14 and delivers hydraulic fluid through an output line 10 to the variable volume and variable pressure auxiliary load 4. Hydraulic fluid from the auxiliary load 4 is returned to the reservoir 14 through a return line 12.

A control line 28 may be provided which leads from the output line 10 to the pump 6 with the control line being used to vary the volume of hydraulic fluid delivered by pump 6 through the output line 10. However, it is not essential that the volume of hydraulic fluid delivered by the pump be varied. Thus, the control line 28 may be regarded as structure which is optional. The pump 6, for example, may be a fixed displacement pump whose capacity is sufficiently large to satisfy any demand placed on it by the variable auxiliary load 4. The engine 2 is then sized so that it provides the necessary power to operate the pump 6 with the engine 2 operating near its idling speed.

A control line 18 leading from the output line 10 may be utilized to operate a throttle control device 20 which is depicted as a hydraulic cylinder. A rod 22 which is movable in response to pressure changes within the throttle control device 20 is connected to a throttle 27 through a throttle lever 24. As the pressure demands of the auxiliary load 4 are increased, additional power is required to drive the pump 6 to provide hydraulic fluid for the load 4. The increased power demands of the load 4 are met by incresing the fuel supplied to the engine 2 with the quantity of fuel being dependent upon the system pressure in line 10, as transmitted through control line 18 to the throttle control device 20. Thus, the torque output from the engine 2 may be automatically regulated by the throttle control device 20 to provide the necessary power for operation of the auxiliary load 4 while maintaining the speed of the engine 2 near its idling speed.

In providing the power for operation of the auxiliary load 4, the engine 2 operates at a speed near its idling speed. Thus, where the primary work function of the engine is to provide power for operation of a truck, the engine may operate at a speed which is about one-quarter or less to about one-third of its maximum speed in providing a horsepower output to the auxiliary load of about one-quarter or less to about one-third of its maximum horsepower output. For example, the speed of the engine 2 may vary from about 700 or less to about 1,000 rpm. in providing the power for operation of the auxiliary load 4.

Due to its operation near its idling speed in supplying power to the auxiliary load 4, the engine 2 provides the necessary power at very low noise levels. Moreover, by operating the engine 2 at a relatively low speed in providing power for the auxiliary load 4, the life of the engine is extended and maintenance costs are reduced. In operating the auxiliary load 4, stalling of the engine 2 may be prevented by varying the fuel supplied to the engine 2 in response to the pressure demands of the variable load 4. The output from the engine is, thus, varied to meet the demands of the load so that the engine output is efficiently used by the load.

The maximum speed and horsepower of the engine 2 are far in excess of that required for operation of the auxiliary load 4. If the speed of the engine 2 was increased to its maximum speed, this would drive the pump 6 at speeds in excess of its capacity and also would result in supplying a quantity of fluid to the load 4 which exceeded its capacity. The centrifugal clutch 26 is used to protect the pump 6 and load 4 from being overdriven by the engine 2. When the engine speed is increased to a predetermined speed in excess of its idling speed, as, for example, when the engine is performing its primary work function, the clutch 26 automatically disengages the auxiliary output shaft 8 from the input shaft 9. For example, the clutch 26 may be set to disengage to shaft 9 when the speed of the engine 2 is increased to about 1,500 rpm.

As illustrated, the auxiliary output shaft 8 is directly driven by the engine 2 so that the shaft rotates continuously when the engine is operating. The apparatus is controlled through actuation of the clutch 26. Various means may be used to control the clutch and one means, for example, may consist of a simple electrical circuit in which a plurality of switches 15, 17, 19 and 21 are connected in series by an input conductor 11 between a source of electrical power 23 and the clutch 26. The switch 21 may be actuated by the ignition system of a vehicle which is powered by the engine 2 such that switch 21 is closed by turning the ignition key in starting the engine.

The switch 19 may be positioned on the dash within a vehicle cab while the switch 17 may be positioned anywhere on the vehicle which is convenient to the load 4. In a refuse packer where the packing mechanism is positioned on the rear of the truck body, the switch 17 would generally be positioned at the rear of the truck body for ease in operating the packing mechanism. The switch 19 serves as a safety measure to prevent injury of children or trespassers through actuation of the switch 17. With switch 19 in an open position, the apparatus cannot be operated out of the view of the driver by the closing of switch 17.

The switch 15 is a speed control switch which may be connected to the engine through a conductor 25. The conductor 25 transmits a signal to switch 15 when the engine 2 reaches a predetermined speed. When the engine 2 exceeds the predetermined speed, the switch 15 is automatically opened to open the clutch 26 and disengage the connection between shafts 8 and 9. This prevents overdriving of the pump 6 or load 4 by the engine 2. As illustrated, the electrically operated clutch 26 may be grounded in a conventional manner through a conductor 13.

The switch 15 may be actuated mechanically as well as electrically. For example, the switch 15 may be opened and closed in response to the speed of rotation of a drive cable connecting the switch 15 to the engine 2. The drive cable which would serve the same function as the conductor 25, may be driven from the shaft 8 in the manner of a speedometer cable. Also, the switch 15 may be made integral with the clutch 26 and be actuated by centrifugal force.

The signal transmitted to the switch 15 through conductor 25 may be generated by sensing the speed at which the distributor contacts are opened and closed or by directly sensing the speed of rotation of shaft 8. For example, a small generator may be driven from a power takeoff to generate an electrical output whose magnitude is directly proportional to the speed of the engine 2. To provide system flexibility, the switch 15 may be adjustable. Then, the switch 15 may be set to open at any desired engine speed as required to protect the particular pump and load present in the system.

A reservoir 14 interconnects the variable load 4 and the pump 6 to provide flexibility in the system so that a variable volume of hydraulic fluid may be used in operating the load 4. If, for example, the load includes hydraulic cylinders having a relatively large volume as used in powering the packing mechanism for a refuse loader, the cylinders may store relatively large quantities of fluid during certain phases of the load cycle. As this occurs, relatively large quantities of hydraulic fluid are withdrawn from the reservoir 14 and transferred to the load 4 through the pump 6. At another point in its operation, the variable load 4 may require a relatively small quantity of fluid for operation. A relatively large quantity of hydraulic fluid would then be stored in the reservoir 14 with a small quantity of hydraulic fluid being used to operate the load 4.

Figure 2:
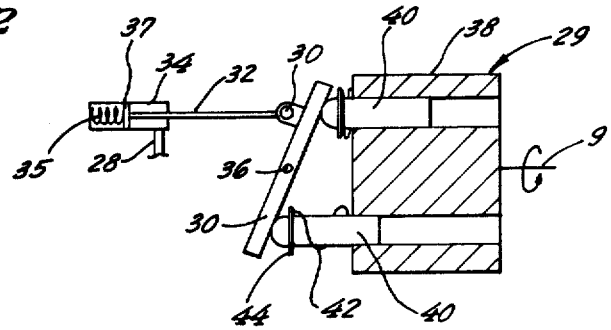
FIG. 2 is a schematic view of a variable displacement pump which may be used in the system illustrated in FIG. 1.

FIG. 2 illustrates a conventional variable displacement pump 29 which may be used in the overall system illustrated in FIG. 1. The variable displacement pump 29 includes a swash plate 30 on a pivotal mounting 36 which engages a pair of pistons 40. The pistons are contained in bores within a pump body 38 and are biased outwardly by springs 42 into contact with the swash plate 30. Retainer rings 44 fixedly positioned on the pistons 40 adjacent their outward ends contact the outer portions of the springs 42 while the inner portions of the springs bear against the pump body 38. The pump body 38 may be rotated by an input shaft 9 with the stroke of the pistons 40 being determined by the angle of the swash plate 30.

A control rod 32 is connected to swash plate 30 through a pivotal connection 33 and is movably positioned by a hydraulic cylinder 34 which receives fluid through control line 28. A piston 37 slidably positioned within the cylinder 34 is connected to the control rod 32 while a spring 35 positioned between the end of the piston 37 and the inner wall of cylinder 34 exerts an outward force on the piston 37 and control rod 32. The outward force exerted by the spring 35 serves to position the swash plate 30 at an angle to provide the maximum displacement of the pistons 40.

When the pressure in control line 28 is increased, which reflects an increased system pressure and an increased pressure demand by the load 4, the piston 37 and control rod 32 are moved to the left from their positions as shown in FIG. 2. This causes a counterclockwise rotation of the swash plate 30 toward a vertical position and thereby reduces the displacement of the pistons 40. This, in turn, reduces the discharge from the variable displacement pump 29. The torque required to drive the variable displacement pump 29 is dependent upon the system pressure in line 10 and also on the volume of fluid being discharged to the system by pump 29. By reducing the volume of fluid discharged from the pump 29 in response to an increase in the pressure demand of the load 4, the torque input required to drive the pump 29 is maintained below a predetermined level. This provides greater system flexibility because it permits the pump 29 to be driven with a relatively low output torque and output speed of the engine 2 without stalling the engine even through the pressure demands of the auxiliary load 4 may have increased sharply.

Figure 3:
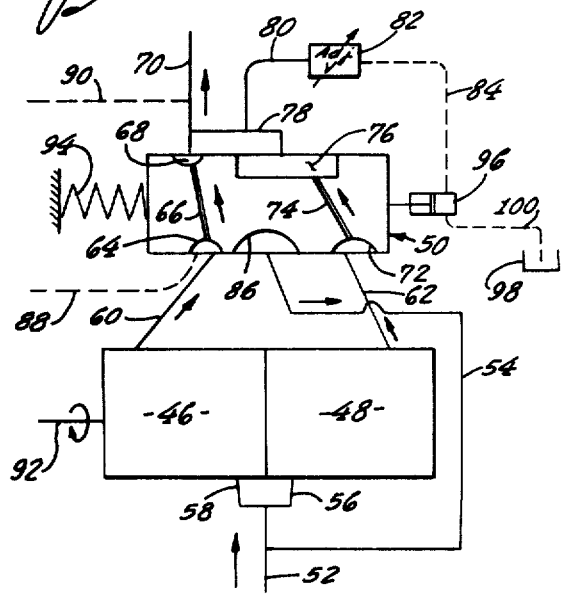
FIG. 3 is a schematic view of a pump and valve arrangement which may be used in the system of FIG. 1 to provide a plurality of fixed displacement pumps to drive the auxiliary load with the number of pumps in operation being varied in response to the pressure demands of the auxiliary load.

Turning to FIG. 3, there is illlustrated a schematic diagram of a plurality of fixed displacement pumps which ar operated by a valving system to vary the discharge from the pump 6 to the system in response to the pressure demands of the auxiliary load 4. As illustrated, a pair of fixed displacement pumps 46 and 48 are driven from a common input shaft 92 which corresponds to the shaft 9 illustrated in FIG. 1. The discharge from the pumps 46 and 48 is controlled by a valve 50 whose position is varied in response to the pressure demands of the auxiliary load 4. An inlet line 52, which is indicated as split into two lines 56 and 58, feeds fluid to a common suction for each of the pumps 46 and 48.

The discharge from pump 46 and the discharge from pump 48 are fed through outlet lines 60 and 62, respectively, to the valve 50. With the valve 50 positioned as shown in FIG. 3, the outlet 60 from pump 46 leads to a valve cavity 64 and to a valve passage 66. The discharge from pump 46 then flows through the valve passage 66 to a valve cavity 68 and to a discharge line 70.

The outlet line 62 from pump 48 leads to a valve cavity 72, then to a valve passage 74, and to a valve cavity 76. The discharge from the pump 48 is, thus, fed to the valve cavity 76 and then to a discharge line 78 which joins the common discharge line 70. With the valve 50 in the position illustrated in FIG. 3, the discharge from both pumps 46 and 48 is, thereby, fed through the valve 50 to the common discharge line 70.

Figure 5:
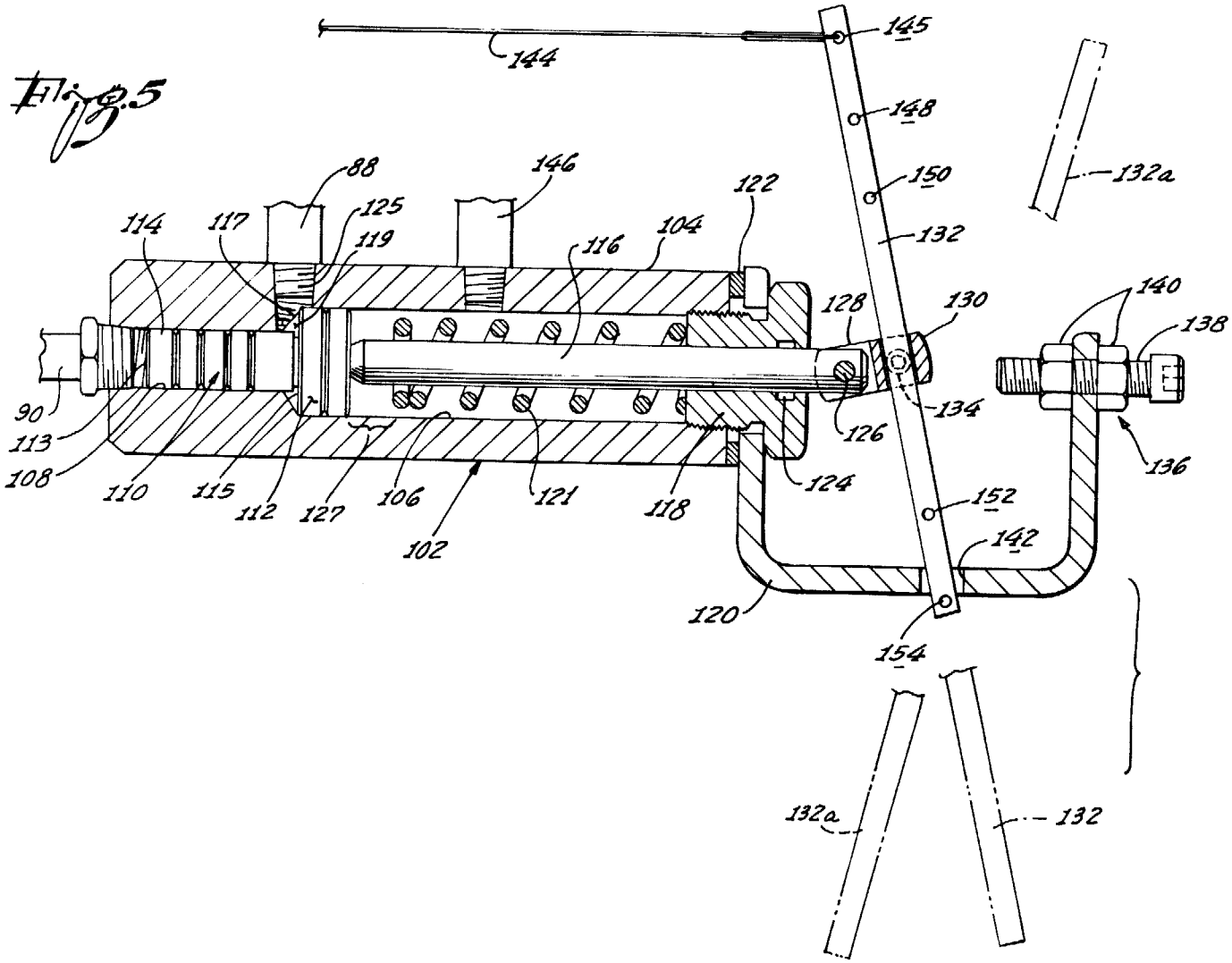
FIG. 5 is a side sectional view of a throttle control device which may be used to vary the fuel supply to the engine in response to the pressure demands of the auxiliary load and the volume of fluid discharged to the system by the pump.

A pressure control line 90 may be connected to the common discharge line 70 to indicate the system pressure which is determined by the pressure demands of the variable load 4. A second pressure control line 88 may be connected to the valve cavity 64 to sense the pressure of the discharge from the pump 46 when this discharge is fed to the system. The pressure control lines 88 and 90 may then be used to operate a throttle control device as shown in FIG. 5 which varies the rate of supplying fuel to the engine to vary its torque output in response to the pressure demands of the system and the volume of fluid discharged to the system by the pumps 46 and 48. It is not necessary, however, that two pressure control lines be used to operate the throttle control device and, if desired, the throttle could be controlled entirely by system pressure as transmitted through control line 90.

A control line 80 is connected to the discharge line 78 and senses the discharge pressure generated by the pump 48. The line 80 leads to a pressure opening valve 82 which is adjustable to open at a predetermined pressure. Leading from the valve 82 is a control line 84 connected to an actuating device, illustrated as a hydraulic cylinder 96, which is operably connected to the valve 50. The hydraulic cylinder 96 works against a spring 94 which is illustrated in FIG. 3 as pushing the valve 50 to the right with the spring in an expanded condition.

A valve cavity 86 overlies a return line 54 leading from the valve 50 to the input line 52. When the valve 50 is in the position shown in FIG. 3, the return line 54 is covered by the valve cavity 86 and does not transmit hydraulic fluid.

As the speed of the engine and the rotational speed of the input shaft 92 are increased during operation of pumps 46 and 48 in working against a variable hydraulic load, the pressure in line 80 gradually builds up to the predetermined opening pressure for valve 82. When the pressure in line 80 is sufficient to open valve 82, the pressure is then transmitted through line 84 to the hydraulic cylinder 96. This causes the valve 50 to shift to the left from its position as shown in FIG. 3, with excess fluid in addition to that required to operate cylinder 96 being fed from cylinder 96 through a bleeder or return line 100 to a sump 98.

Figure 4:
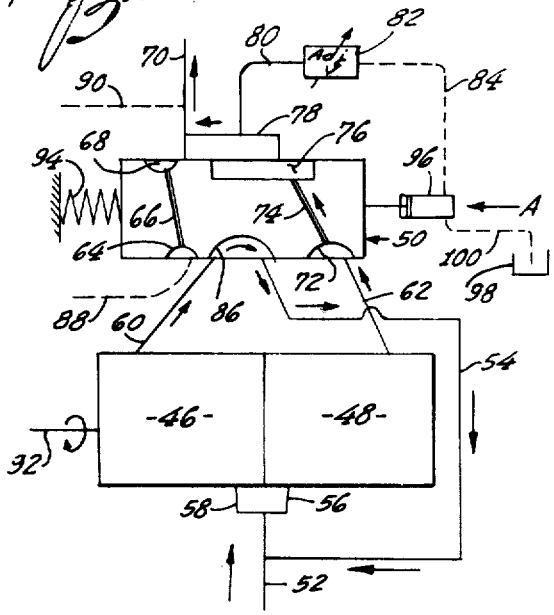
FIG. 4 is a schematic view of the pumps and valving engagement illustrated in FIG. 3 in which the valve has been shifted to decrease the volume of fluid discharged to the system in providing power for operation of the auxiliary load.

The valve 50 is shown in its shifted position in FIG. 4, after having shifted in the direction of the arrow A. With the valve shifted, the outlet line 60 from pump 46 leads to the valve cavity 86 and then to te return line 54. The discharge from the pump 46 is, thus, recycled through line 54 to the inlet line 52 and is returned through lines 56 and 58 to the common suction for pumps 46 and 48. After shifting of the valve 50, the discharge line 62 from pump 48 is still connected through the elongated valve cavities 72 and 76 to the discharge line 78. Thus, after shifting of valve 50 in the direction of arrow A, only the discharge from pump 48 is conveyed through the valve to the discharge line 70.

When the valve 50 has shifted to its FIG. 4 position, there is a reduction in the flow rate of hydraulic fluid into the system since the discharge from pump 46 is recycled. The input torque required to drive pumps 46 and 48 through input shaft 92 is proportional to the volume of fluid discharged by the pumps 46 and 48 to the system and also to the system pressure in line 70. Thus, the reduction in flow rate caused by the shift of valve 50 causes a sharp reduction in the input torque required to drive pumps 46 and 48.

When the valve 50 is in its shifted position, the pressure in valve cavity 64 drops to zero. This causes a corresponding reduction in the pressure in control line 88. Due to the drop in pressure in control line 88, the only pressure received by a throttle control device is through control line 90. The overall pressure received by a throttle control device is thus sharply reduced which may be used to cause a corresponding reduction in the quantity of fuel being fed to the engine and the output torque generated by the engine to match the decreased input torque then required for operation of pumps 46 and 48.

When the pressure in control line 80 drops below the predetermined opening pressure for valve 82, the valve closes and the spring 94 expands to return valve 50 to its position as shown in FIG. 3. As this occurs, hydraulic fluid in the hydraulic cylinder 96 is exhausted through a line 100 to a sump 98. With the valve 50 returned to its FIG. 3 position, the discharge from both pumps 46 and 48 is again fed to the common discharge line 70 to supply an increased volume of hydraulic fluid to the variable load 4. Also, with the valve 50 in its return position, the pressure sensed by control line 88 is the discharge pressure from the pump 46. This pressure may be transmitted through control line 88 to a throttle control device together with the system pressure through control line 90. This increased pressure may be used to cause an increase in the quantity of fuel being fed to the engine to provide a greater output torque to match the increased input torque then required when both pumps 46 and 48 are discharging hydraulic fluid to the load system.

The combination of pumps and valving illustrated in FIGS. 3 and 4 is commercially available equipment. It may, for example, be purchased from Tyrone Hydraulics, Inc. of Corinth, Mississippi as part numbers SH20250-200A-DJ or SH20-300-250A-DJ. If a volume responsive or a volume and pressure responsive valve is used in the system of FIGS. 3 and 4 in lieu of the pressure responsive valve 82, the system may be made responsive to the volume of fluid discharged by pumps 46 and 48 or to both the volume of discharged fluid and also the system pressure in regulating the volume of fluid discharged to the load system by pumps 46 and 48.

FIG. 5 illustrates a throttle control device 102 which is particularly suitable for use in the system described in FIGS. 3 and 4. The throttle device 102 includes a body 104 having an enlarged central body cavity 106 and a reduced central body cavity 108. A piston 110 is positioned within the enlarged and reduced body cavities 106 and 108 and has an enlarged diameter portion 112 received by cavity 106 and a reduced diameter portion 114 received by cavity 108. A sloped transition wall 117 interconnects the diameters of the enlarged cavity 106 and the reduced cavity 108. With the piston 110 in retracted position as shown in FIG. 5, the enlarged diameter portion 112 bears against the juncture between the transition wall 117 and the diameter of the enlarged body cavity 106. An annular piston face 115, thereby, forms a transition cavity 119 with the transition wall 117.

The outer face of piston 110 bears against a rod 116 which passes through an aperture in an end closure 118 that is threadedly received within the body 104. A U-bracket 120 is fixedly held against the end of body 104 by the end closure 118, which passes through a hole in the U-bracket. A gasket 122 is positioned between the end face of the body 104 and the U-bracket 120 and a seal 124 slidably surrounds the rod 116 to prevent leakage of hydraulic fluid between the rod 116 and the end closure 118.

The control line 90, shown in FIGS. 3 and 4, which enses the system pressure imposed by the variable load l, transmits hydraulic fluid to the reduced body cavity .08 through a standard threaded connector which is hreadedly received by body 104. Hydraulic fluid con-'eyed through control line 90 exerts pressure against a educed piston surface area 113 to move the piston 110 o the right from its position shown in FIG. 5. The :ontrol line 88 described in FIGS. 3 and 4 enters the ›ody 104 through a side port 125. When the discharge rom pump 46 is directed to the system, as illustrated in 'IG. 3, the discharge pressure from pump 46 is con-'eyed through control line 88 to the throttle control levice 102 and exerts pressure against the annular ›iston face 115. This also exerts a force which pushes he piston 110 to the right from its position shown in 'IG. 5.

The pressure exerted on the annular piston face 115 s proportional to the volume of fluid discharged to the ystem by pumps 46 and 48 (FIGS. 3 and 4) since ›ressure is exerted against piston area 115 only when ›ump 46 is discharging hydraulic fluid to the system. The pressure exerted on piston surface 113 through :ontrol line 90 is, on the other hand, proportional to the ystem pressure and the pressure demands of the vari-ıble load. Thus, the movement of piston 110 reflects ›oth the volume of hydraulic fluid discharge to the load ystem by pumps 46 and 48 and, also, the pressure lemands imposed by the variable load. The input orque required for operation of pumps 46 and 48 is letermined by both the pressure demands of the vari-ıble load 4, and also the volume of fluid discharged to he system by the pumps. Thus, the movement of the ›iston 110 is controlled by the same variables which letermine the input torque required for operation of ›umps 46 and 48.

The outer end of the rod 116 is connected through a ›ivot support 126 to a clevis 128. The clevis 128 con-ains an aperture 130 which receives a control lever 132. The control lever 132 is held within aperture 130 ›y means of a set screw 134 that is threadedly received ›y the clevis 128 and bears against control lever 132.

The lower end of the control lever 132 engages a ›ivot opening 142. Thus, as the control rod 116 is noved outwardly through movement of piston 110, the :ontrol lever 132 is pivoted with respect to the pivot ›pening 142 which acts as a fulcrum. During the pivot-ng of control lever 132, the clevis 128 undergoes piv-›tal movement with respect to rod 116 about the pivot ıupport 126. After rotation of the control lever 132 hrough movement of the rod 116, the control lever nay, for example, occupy the position illustrated as 132a.

A throttle cable 114 is connected to an opening 145 n the control lever 132 adjacent its upper end. The ›ther end of the throttle cable 144 is attached to a hrottle lever as depicted at 24 in FIG. 1. As the rod 116 is extended and the control lever 132 is pivoted, he throttle lever, is thereby moved by the throttle :able 144 to vary the amount of fuel being fed to the :ngine.

A spring 121 is positioned within the enlarged body :avity 106 and surrounds the rod 116. With the piston 110 in its retracted position, there is a gap 127 between he end of the spring 121 and the outer surface of the ›iston 110. Thus, as hydraulic fluid is initially received ›y the throttle control device 102 through control lines 88 and 90, there is a rapid movement of piston 110 and rod 116 to the right from their positions shown in FIG. 5. When the movement of piston 110 brings it into engagement with spring 121, the continued movement of piston 110 and rod 116 is slowed down by the resistive force of the spring. The function of the throttle control device 102 is to control the fuel supplied to the engine in such a manner that the output torque from the engine approximates the input torque required for operation of pumps 46 and 48. Thus, the spring 121 is designed to have a spring rate which provides a movement of rod 116 in response to the pressures exerted on the piston 110 to produce an engine output which approximates the required input torque to pumps 46 and 48.

The movement of the engine throttle lever in response to movement of rod 116 may also be controlled by the position of the control lever 132. As the control lever 132 is pivoted, the movement experienced by the throttle cable 144 is a function of the moment arm between the opening 145 and the pivot opening 142. This distance can be lengthened or shortened by loosening the set screw 134 and moving the control rod 132 upwardly or downwardly within aperture 130. In addition, the movement of the engine throttle may be varied by providing a plurality of openings 148, 150, 152, 154, etc. in the control lever 132. By moving the attachment of the throttle cable 144 from opening 145 to opening 148, the degree of movement of cable 144 will be reduced when the lever 132 is rotated. Also, if the control lever 132 is moved downwardly by loosening the set screw 130, the throttle cable 144 may be attached to an opening such as 152 or 154 which is positioned very close to pivot opening 142. This provides a very short movement of cable 144 in response to pivoting of control lever 132.

In the operation of the throttle control device 102, the output torque of the engine is varied in response to the power demands of the variable load. However, at the same time, the speed of the engine is maintained near its idling speed. An adjustable stop 136 limits the maximum movement of the rod 116 and the maximum rotation of the control lever 132. The adjustable stop 136 is composed of a screw 138 retained within an aperture in U-bracket 120 by nuts 140 which threadedly engage the screw 138 and bear against opposite sides of the U-bracket. By adjusting the position of screw 138, the maximum movement of rod 116 and the maximum rotation of control lever 132 may be varied to control the maximum engine speed in providing power for the auxiliary load.

To ensure a low hysteresis loss and a quick movement of piston 110 and rod 116, the piston 110 has a relatively loose fitting engagement with the diameters of reduced body cavity 108 and enlarged body cavity 106. This permits hydraulic fluid to pass between the exterior surfaces of piston 110 and the diameters of cavities 106 and 108. A return line 146 conveys hydraulic fluid from the enlarged body cavity 106 to a reservoir, as shown at 14 in FIG. 1. Thus, there is a slow but constant flow of hydraulic fluid through the throttle control device 102 during its operation.

Figure 6:
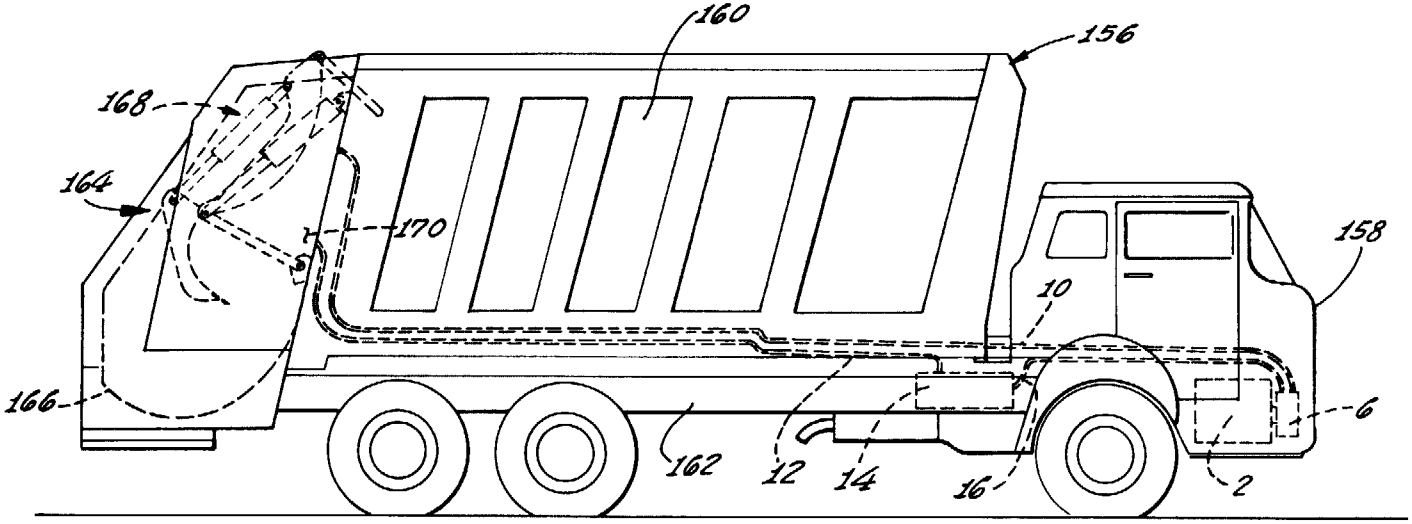
FIG. 6 is a side elevational view of a refuse collection vehicle showing in phantom line drawing a packing mechanism operated by a pump driven by the vehicle engine at a speed near its idling speed.

The use of the present apparatus and method in operating a packing mechanism for a refuse truck is illustrated in FIG. 6. A refuse collection vehicle 156 including a cab 158 and a refuse containing body 160 mounted on a frame 162, has a tailgate 164 positioned rearwardly of the body 160. The tailgate 164 may be pivotally mounted at its top to the body 160 such that it can be rotated upwardly for ejection of refuse from the body.

As shown in phantom line drawing, the tailgate 164 contains a hopper 166 and a packing mechanism 168 mounted within the tailgate 164. The packing mechanism may include one or more packing panels which are actuated hydraulically, e.g. through use of hydraulic cylinders, to move refuse from the hopper 166 through an opening positioned in the region identified by numeral 170 between the hopper 164 and storage body 160. The particular form of the packing mechanism is not critical to the present invention and any hydraulically operated mechanism may be used.

The packing mechanism 168 is operated by a pump 6 driven by the vehicle engine 2 at a speed near the engine idling speed. The pump 6 receives hydraulic fluid from a reservoir 14 through line 16 and supplies fluid to the packing mechanism 168 through line 10. Hydraulic fluid is returned to the reservoir 14 from the packing mechanism 168 through line 12. In identifying the engine, pump, reservoir, etc., the same reference numerals are used as in FIG. 1. A throttle control and a means for varying the output volume and pressure of the pump 6 may be included in the system shown in FIG. 6 for the reasons described previously with regard to FIG. 1. Also, a clutch 26 and means to operate the clutch (shown in FIG. 1) may be utilized in the system of FIG. 6 to disengage the drive between engine 2 and pump 6 when the engine speed reaches a predetermined level. This prevents the pump 6 and packing mechanism 168 from being overdriven by the engine 2. Additionally, a variable displacement pump (FIG. 2) or a plurality of fixed displacement pumps (FIGS. 3 and 4) may be used as the pump 6 in FIG. 6. This permits varying the volume and pressure of hydraulic fluid supplied to the packing mechanism 168 in response to the load demands of the mechanism to maintain the input torque to the pump 6 below a predetermined level. Preferably, the fuel supplied to the engine 2 is also varied in response to the volume and pressure of fluid supplied to the packing mechanism 168 through the use of a throttle control device such as that shown in FIG. 5. This permits varying the output torque of the engine 2 in a manner which is correlated with variations in the input torque required by the pump 6. The engine output is, thus, more efficiently used by the pump in driving the packing mechanism 168.

As illustrated by the foregoing description, the invention provides an apparatus which is quite versatile in providing power for operation of a variable volume and a variable pressure auxiliary load. By driving the auxiliary load with a relatively large engine operating near its idling speed, the operation is carried out at low noise levels and with reduced engine wear. Moreover, the torque output of the engine is more effectively utilized by the load to provide a more efficient use of the engine output.

Throughout the foregoing description, the engine has been described as performing a secondary work function in providing power for an auxiliary load. If desired, however, the overall system of the present invention could be used in providing power to a primary load using a sufficiently oversized engine to power the load at a relatively low engine speed near its idling speed. Although this would increase the initial investment in requiring a larger engine, this investment cost would be offset by a reduction in the resulting noise levels which might justify the increased cost depending on the particular use application.

Also, as described previously, the auxiliary load has been illustrated as a variable volume and variable pressure load since this is the area where the invention has the greatest application. If desired, the apparatus and method of the present invention may be used in operating a variable volume-constant pressure load, a variable pressure-constant volume load or a constant volume-constant pressure load. By using the principles of the present invention, any of these various types of loads may be operated at low noise levels which would be highly desirable in reducing the effect of noise pollution on the ecology.

The throttle control device, 102, as described previously, functions as a governor in limiting engine speed as well as functioning to vary the fuel supplied to the engine in response to the power demands of the load and the input torque requirements of the pump or pumps. If desired, depending on the size of the engine and the demands of the auxiliary load, the engine may be controlled simply by a governor to limit its speed in operation of the load. If, for example, the engine employed is a diesel, the engine speed may be also controlled by an underspeed throttle control to maintain a given minimum engine speed and to not permit the engine to operate at a slower speed while providing power to the auxiliary load.

As described previously, the engine may provide power directly to a pump or pumps in driving an auxiliary load. Also, however, the pump may be driven by the engine through an intermediate power means such as an electric motor. Thus, for example, the engine may drive an auxiliary alternator to supply power to an electric motor used to drive the pump or pumps.

A speed control means, such as an electric clutch, may be used to prevent the engine from overdriving the pump or the load, as described previously. Also, however, a speed override may be used to prevent increase in engine speed above a predetermined level by the vehicle operator when the engine is drivingly engaged with the pump and the load.

I claim:

1. A noise reduction apparatus for operating a variable volume and variable pressure auxiliary load, said apparatus comprising:

pump means having a capacity which is sufficiently large to supply said load at a relatively low pump speed;

said pump means including a plurality of fixed displacement pumps supplying hydraulic fluid to the variable load;

means to vary the number of pumps supplying fluid to the load in response to the demands of the load;

engine means operably connected to said pump means for supplying power to said pump means in performing a secondary work function at a speed near the idling speed of said engine means;

throttle control means governing the flow of fuel to the engine means to maintain its horsepower output at a level sufficient to operate the pump means while maintaining the speed of said engine means at a speed near its idling speed; and means to maintain the flow rate from the pump means at a sufficiently low level to not exceed the capacity of the pump means or the auxiliary load when the engine speed is increased to a predetermined level in excess of its idling speed;

whereby the engine means operates in the low noise level region of speeds near its idling speed or less when supplying power for the pump means in operating the variable volume and variable pressure load, and the pump means and auxiliary load are protected from use in excess of their capacity when the engine means is operating at increased speeds.

2. A noise reduction apparatus as defined in claim 1 wherein the number of fixed displacement pumps supplying fluid to the variable load is decreased when the pressure demands of the load are increased to maintain the torque required to drive the pumps below a predetermined level.

3. A noise reduction apparatus for operating a variable volume and variable pressure auxiliary hydraulic load comprising:

a variable pressure and variable volume pump means;

engine means operably connected to the pump means for supplying power to the pump means in performing a secondary work function at speeds near the idling speed of the engine means;

a fluid reservoir in flow communication with the pump means and the auxiliary load to provide a variable volume of hydraulic fluid for operation of the variable load;

means to vary the output pressure and volume of hydraulic fluid from the pump means in response to the demands of the variable load;

said pump means including a plurality of fixed displacement pumps with the number of pumps supplying fluid to the variable load being varied in response to the demands of the variable load;

throttle control means governing the flow of fuel to the engine means to maintain a torque output of the engine means at a level sufficient to operate the pump means under various loading conditions imposed by the variable load;

said throttle control means being actuated in response to the volume and pressure of fluid discharged by the pump means to the variable load, and means to maintain the flow rate of fluid to the variable load at or below a predetermined level.

4. In combination, a throttle control device for varying the quantity of fuel fed to an engine and a plurality of fixed displacement pumps driven by the engine and providing hydraulic fluid to drive a variable load comprising:

means to vary the number of pumps discharging hydraulic fluid to the load in response to the demands of the load;

first sensing means to transmit pressure to the throttle control device from the pumps with the transmitted pressure being proportional to the number of pumps discharging fluid to the variable load;

second sensing means to transmit pressure to the throttle control device with the transmitted pressure being proportional to the pressure of the hydraulic fluid fed to the load by the pumps;

first pressure receiving means in the throttle control device for receiving pressure from the first sensing means;

second pressure receiving means in the throttle control device for receiving pressure from the second sensing means, and means in the throttle control device actuatable by the first and second pressure receiving means to transmit movement to the engine throttle with the degree of movement being dependent on both the pressure and volume of fluid discharged by the pumps, whereby the torque output of the engine is varied in response to the torque input required to drive the pumps.

5. The combination of claim 4 wherein the throttle control device includes a movable piston having differential pressure receiving areas, with one of said areas receiving the pressure from the first sensing means and another of said areas receiving the pressure from the second sensing means, and said piston being operably connected to the engine throttle control to transmit movement to the throttle control in response to the volume and pressure of fluid discharged to the load by the pumps.

6. The throttle control device of claim 5 including spring means resiliently biasing said piston to a retracted position and imposing a resistive force to movement of said piston.

7. The throttle control device of claim 6 including a gap between the spring means and the piston when the piston is in a retracted position, whereby the initial movement of the piston in response to pressure received from the pump is relatively rapid to provide a quick initial response of the throttle control device when the pumps begin their operation.

8. The combination of claim 4 including stop means in the throttle control device to limit the degree of movement imparted to the engine throttle.

* * * * *